(12) United States Patent
Allione et al.

(10) Patent No.: US 11,748,929 B2
(45) Date of Patent: Sep. 5, 2023

(54) APPARATUS, METHOD, AND COMPUTER-READABLE STORAGE MEDIUM FOR EXPANDING AN IMAGE DATABASE FOR EVALUATION OF EYEWEAR COMPATIBILITY

(71) Applicant: Essilor International, Charenton-le-Pont (FR)

(72) Inventors: Pascal Allione, Charenton-le-Pont (FR); Thierry Bonnin, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 17/786,472

(22) PCT Filed: Dec. 11, 2020

(86) PCT No.: PCT/EP2020/085815
§ 371 (c)(1),
(2) Date: Jun. 16, 2022

(87) PCT Pub. No.: WO2021/122387
PCT Pub. Date: Jun. 24, 2021

(65) Prior Publication Data
US 2023/0028741 A1    Jan. 26, 2023

(30) Foreign Application Priority Data

Dec. 19, 2019 (EP) .................................. 19306709
Dec. 23, 2019 (EP) .................................. 19306761

(51) Int. Cl.
*G06T 11/60* (2006.01)
*G06T 7/12* (2017.01)
(Continued)

(52) U.S. Cl.
CPC ............ *G06T 11/60* (2013.01); *G06F 16/535* (2019.01); *G06T 3/40* (2013.01); *G06T 7/12* (2017.01);
(Continued)

(58) Field of Classification Search
CPC ......... G06T 7/66; G06T 7/12; G06T 2210/62; G06T 3/40; G06T 11/60;
(Continued)

(56) References Cited

U.S. PATENT DOCUMENTS 6,095,650 A    8/2000  Gao et al.
6,231,188 B1   5/2001  Gao et al.
(Continued)

FOREIGN PATENT DOCUMENTS

WO        WO 00/16683 A1    3/2000

OTHER PUBLICATIONS

International Search Report dated Mar. 4, 2021 in PCT/EP2020/085815 filed on Dec. 11, 2020 (citing references AA-AG & AO therein, 4 pages).

(Continued)

*Primary Examiner* — Phi Hoang
(74) *Attorney, Agent, or Firm* — Oblon, McClelland, Maier & Neustadt, L.L.P.

(57) ABSTRACT

The present disclosure relates to a method for expanding an image database for evaluation of eyewear compatibility. In particular, the present disclosure relates to a method, comprising receiving a user image, receiving a frame image, processing the received frame image by setting, as transparent, pixels of the received frame image except for an anterior (Continued)

face of the frame, defining, within the processed frame image, a left boundary and a right boundary of the anterior face of the frame, the left boundary and the right boundary corresponding to the left eye and the right eye, respectively, receiving a filter image, processing the received filter image by setting, as transparent, pixels in the received filter image outside the frame based on the left boundary and the right boundary, merging the processed frame image and the processed filter image, and overlaying the merged image onto the received user image.

17 Claims, 15 Drawing Sheets

(51) Int. Cl.
  *G06T 7/66* (2017.01)
  *G06F 16/535* (2019.01)
  *G06T 3/40* (2006.01)

(52) U.S. Cl.
  CPC ...... *G06T 7/66* (2017.01); *G06T 2207/20021* (2013.01); *G06T 2207/30201* (2013.01); *G06T 2210/62* (2013.01)

(58) Field of Classification Search
  CPC . G06T 2207/20021; G06T 2207/30201; G06T 11/00; G06T 7/70; G06F 16/535; G02C 13/003
  See application file for complete search history.

(56) References Cited

U.S. PATENT DOCUMENTS

| | | | |
|---|---|---|---|
| 9,245,499 B1* | 1/2016 | Surkov | G06T 7/60 |
| 10,217,312 B1* | 2/2019 | McClellan | G07F 17/3206 |
| 2001/0026351 A1 | 10/2001 | Gao et al. | |
| 2012/0313955 A1 | 12/2012 | Choukroun | |
| 2015/0310672 A1 | 10/2015 | Choukroun | |
| 2016/0232712 A1 | 8/2016 | Choukroun | |
| 2018/0005448 A1 | 1/2018 | Choukroun | |
| 2018/0252942 A1* | 9/2018 | Gamliel | A61B 3/0025 |
| 2019/0146246 A1* | 5/2019 | Fonte | G02C 7/024 |
| | | | 351/204 |
| 2019/0164210 A1* | 5/2019 | Kornilov | G06Q 30/0631 |
| 2021/0065285 A1* | 3/2021 | Goldberg | G06T 19/20 |

OTHER PUBLICATIONS

Written Opinion dated Mar. 4, 2021 in PCT/EP2020/085815 filed on Dec. 11, 2020 (citing reference AA therein, 8 pages).

* cited by examiner

APPARATUS, METHOD, AND COMPUTER-READABLE STORAGE MEDIUM FOR EXPANDING AN IMAGE DATABASE FOR EVALUATION OF EYEWEAR COMPATIBILITY

BACKGROUND

Field of the Disclosure

The present disclosure relates to eyewear and, specifically, to generating an image database for evaluation of eyewear compatibility.

Description of the Related Art

During the selection of new visual equipment, or eyewear, a user is often left to self-reflection in determining the aesthetics of new eyewear on their face. Moreover, when deciding between multiple pieces of eyewear, a user may find it difficult to decide which piece is most attractive, has the most utility, or is the most suited to their particular facial bone structure and features. At the same time, the user may be grappling with their own opinion of the new eyewear on their face and the hypothetical opinions of third parties (e.g., friends, family, professionals, etc.) regarding the fit of the new eyewear on their face.

In order to provide an eyewear recommendation tool that can, upon receiving an image of a user wearing eyewear, generate a fit evaluation or recommendation based on the unique traits of the user and the eyewear, large image databases must be compiled so that an algorithm may be trained to generate an accurate fit evaluation when presented with an unknown combination of user and eyewear. Such large image databases may include thousands of images of users wearing eyewear and may, understandably, be arduously assembled by acquisition of photographs of each desired combination of user and eyewear. For instance, if an eyewear inventory includes twenty-five eyewear possibilities, a corresponding database may include at least multiples of twenty-five photographs wherein each eyewear is worn by a given user. It can be appreciated that acquiring real photos of each of these combinations is, at best, impractical, and may be made more so when one considers the diverse range of ages, genders, ethnicities, and the like needed to generate a comprehensive database.

In view of the above, a human-effort light approach for expanding an image database for evaluation of eyewear compatibility is needed in order to allow for comprehensive and accurate evaluation of diverse combinations of users and eyewear. The present disclosure describes a series of solutions thereto.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to an apparatus, method and computer-readable storage medium for expanding an image database for evaluation of eyewear compatibility.

According to an embodiment, the present disclosure is further related to a method for expanding an image database for evaluation of eyewear compatibility, comprising receiving a user image of a face of a user, receiving a frame image of a frame of eyewear from a plurality of images of frames of eyewear, processing, by processing circuitry, the received frame image by setting, as transparent, pixels of the received frame image except for an anterior face of the frame of the eyewear, defining, within the processed frame image, a left boundary and a right boundary of the anterior face of the frame of the eyewear, the defined left boundary and the defined right boundary corresponding to the left eye and the right eye, respectively, receiving a filter image of a filter modeling a lens coating of the eyewear, processing, by the processing circuitry, the received filter image by setting, as transparent, pixels in the received filter image outside the frame of the eyewear based on the defined left boundary and the defined right boundary of the anterior face of the frame of the eyewear, merging the processed frame image and the processed filter image, and overlaying, by the processing circuitry, the merged processed frame image and the processed filter image onto the received user image of the face of user.

According to further embodiments which can be considered alone or in combination:
  the receiving includes receiving the frame image of the frame of the eyewear and two or more images of temples of the frame of the eyewear, the two or more images of the temples of the frame of the eyewear being utilized during the overlaying; and/or
  the processing includes processing the received frame image by centering the received frame image based on the received user image and fit models defining mounting the frame of the eyewear on the face of the user; and/or
  the centering includes centering the received frame image according to an orientation of the face of the user in the received user image; and/or
  the processing includes processing the received frame image by scaling the received frame image based on the received user image and one or more scaling factors, the one or more scaling factors including a pupillary factor, the pupillary factor being a relationship between a real pupillary distance and a digital pupillary distance, the digital pupillary distance being measured on the received frame image; and/or
  the digital pupillary distance is determined by calculating a distance between pupils of eyes of the user, the pupils of the eyes of the user being defined as gravity centers of palpebral fissures of the face of the user; and/or
  the method further comprises processing the received user image of the face of the user based on the defined left boundary and the defined right boundary of the anterior face of the frame of the eyewear, pixels in the received user image outside the defined left boundary and the defined right boundary being set as transparent; and/or
  the method further comprises applying a corrective factor to the processed received user image based on a vision prescription of the user; and/or
  the method further comprises applying a corrective factor to the processed received user image based on a material of the frame of the eyewear of the processed frame image and the filter of the processed filter image; and/or
  the received filter image is centered and scale according to the processed frame image.

According to an embodiment, the present disclosure is further related to an apparatus for expanding an image database for evaluation of eyewear compatibility, comprising processing circuitry configured to receive a user image of a face of a user, receive a frame image of a frame of eyewear from a plurality of images of frames of eyewear, process the received frame image by setting, as transparent, pixels of the received frame image except for an anterior face of the frame of the eyewear, define, within the processed frame image, a left boundary and a right boundary of the anterior face of the frame of the eyewear, the defined left boundary and the defined right boundary corresponding to the left eye and the right eye, respectively, receive a filter image of a filter modeling a lens coating of the eyewear, process the received filter image by setting, as transparent, pixels in the received filter image outside the frame of the eyewear based on the defined left boundary and the defined right boundary of the anterior face of the frame of the eyewear, merge the processed frame image and the processed filter image, and overlay the merged processed frame image and the processed filter image onto the received user image of the face of user.

According to further embodiments which can be considered alone or in combination:

- the processing circuitry is further configured to process the received frame image by centering the received frame image based on the received user image and fit models defining mounting the frame of the eyewear on the face of the user; and/or
- the processing circuitry is further configured to process the received frame image by scaling the received frame image based on the received user image and one or more scaling factors, the one or more scaling factors including a pupillary factor, the pupillary factor being a relationship between a real pupillary distance and a digital pupillary distance, the digital pupillary distance being measured on the received frame image; and/or
- the processing circuitry is further configured to process the received user image of the face of the user based on the defined left boundary and the defined right boundary of the anterior face of the frame of the eyewear, pixels in the received user image outside the defined left boundary and the defined right boundary being set as transparent; and/or
- the processing circuitry is further configured to apply a corrective factor to the processed received user image based on a vision prescription of the user; and/or
- the processing circuitry is further configured to center and scale the received filter image according to the processed frame image.

According to an embodiment, the present disclosure is further related to a non-transitory computer-readable storage medium storing computer-readable instructions that, when executed by a computer, cause the computer to perform a method for expanding an image database for evaluation of eyewear compatibility, comprising receiving a user image of a face of a user, receiving a frame image of a frame of eyewear from a plurality of images of frames of eyewear, processing the received frame image by setting, as transparent, pixels of the received frame image except for an anterior face of the frame of the eyewear, defining, within the processed frame image, a left boundary and a right boundary of the anterior face of the frame of the eyewear, the defined left boundary and the defined right boundary corresponding to the left eye and the right eye, respectively, receiving a filter image of a filter modeling a lens coating of the eyewear, processing the received filter image by setting, as transparent, pixels in the received filter image outside the frame of the eyewear based on the defined left boundary and the defined right boundary of the anterior face of the frame of the eyewear, merging the processed frame image and the processed filter image, and overlaying the merged processed frame image and the processed filter image onto the received user image of the face of user.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The terms "eyewear", "equipment", "equipments", "eyeglass frame", "eyeglass frames", "eyeglass", "eyeglasses", and "visual equipments" may be used interchangeably to refer to an apparatus having both a frame and a lens. The term "visual equipment" may be used to refer to a single visual equipment while the term "visual equipments" may be used to refer to more than one visual equipment. Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Similarly, the terms "image of a face" and "image of a face of a person" are corresponding terms that may be used interchangeably. Thus, the appearances of such phrases or in various places throughout this specification are not necessarily all referring to the same embodiment. Furthermore, the particular features, structures, or characteristics may be combined in any suitable manner in one or more embodiments without limitation.

Figure 1:
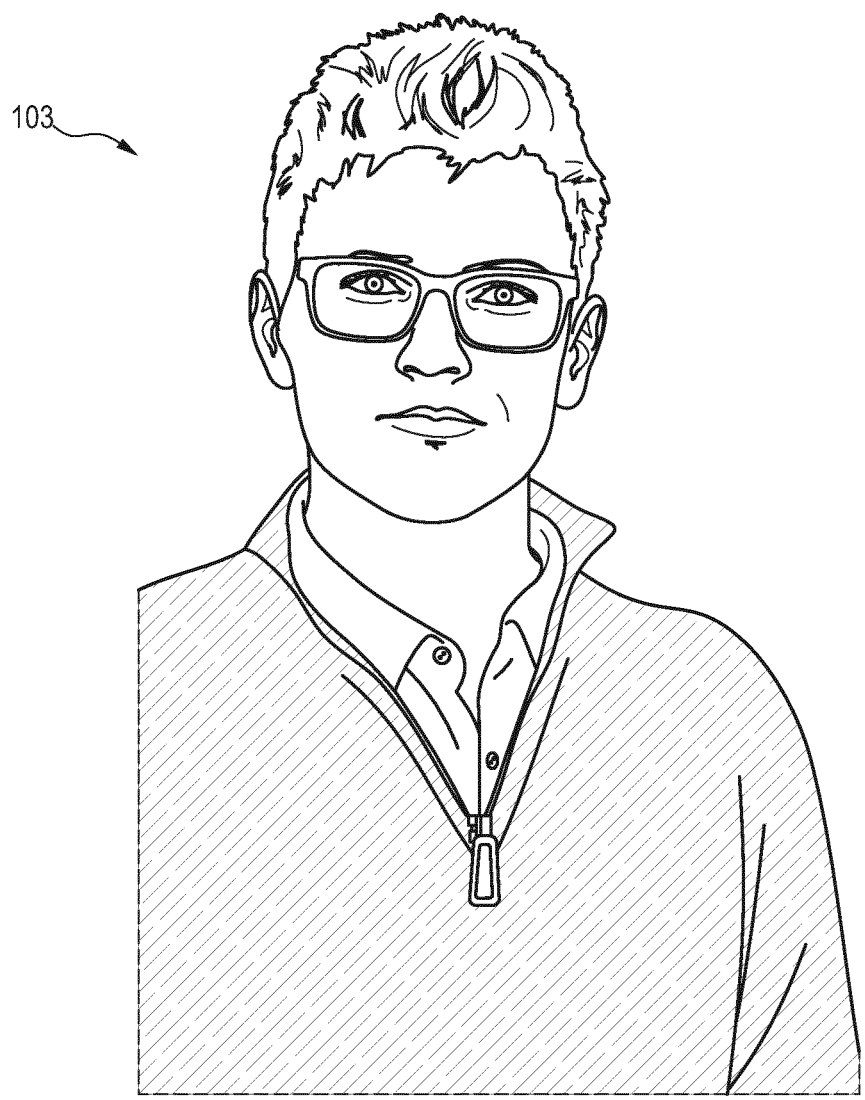
FIG. 1 is an illustration of a user wearing an eyeglass frame, according to an exemplary embodiment of the present disclosure.
Figure 2:
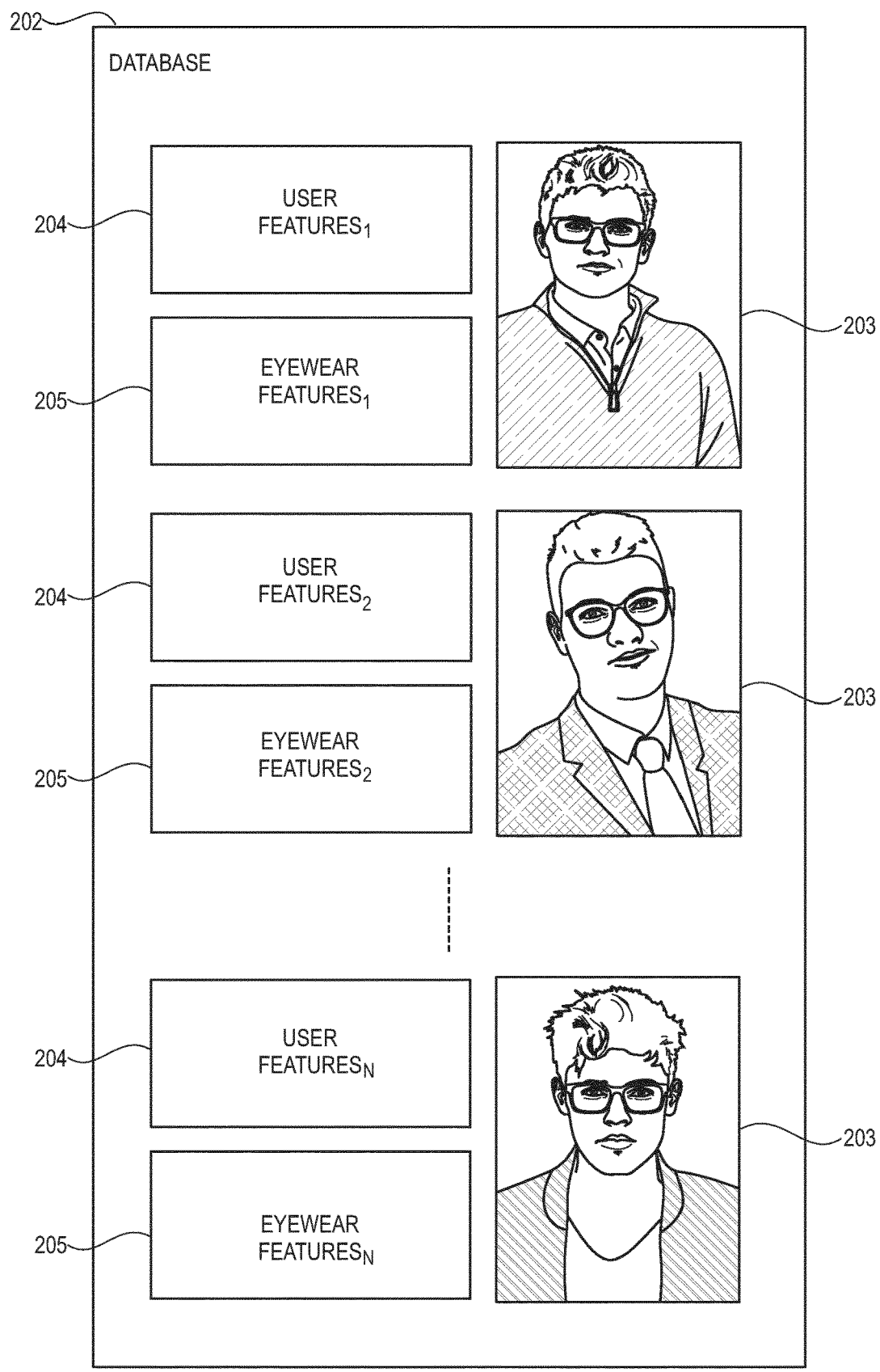
FIG. 2 is an exemplary image database, according to an exemplary embodiment of the present disclosure.

When selecting new eyewear, users may desire a third party to provide an opinion regarding eyewear aesthetics as well as structural fit in view of optical functionality. In order to provide a robust recommendation, recommendation models based on statistical methods, or other learning processes, can provide robust recommendations through evaluation and training on a reference database of 'labeled' images. For instance, a learning discriminant analysis (LDA) approach may be applied to a reference database to allow for automated analysis of a new image. With reference to FIG. 1 and FIG. 2, a reference database 202 may include 'labeled' images of users wearing eyewear 103, 203, the labels reflecting an evaluation of relationships between user features 204 and eyewear features 205. The LDA may be trained to associate positional relationships of the eyewear features 205 and user features 204 within the 'labeled' images as being acceptable or not. In an example, the 'labeled' images of the reference database may be 'labeled' by a specific third party group (e.g., eye care professionals) and may include evaluations of specific features of the image or an evaluation of general fit of eyewear and the face of the person in the image.

Figure 3:
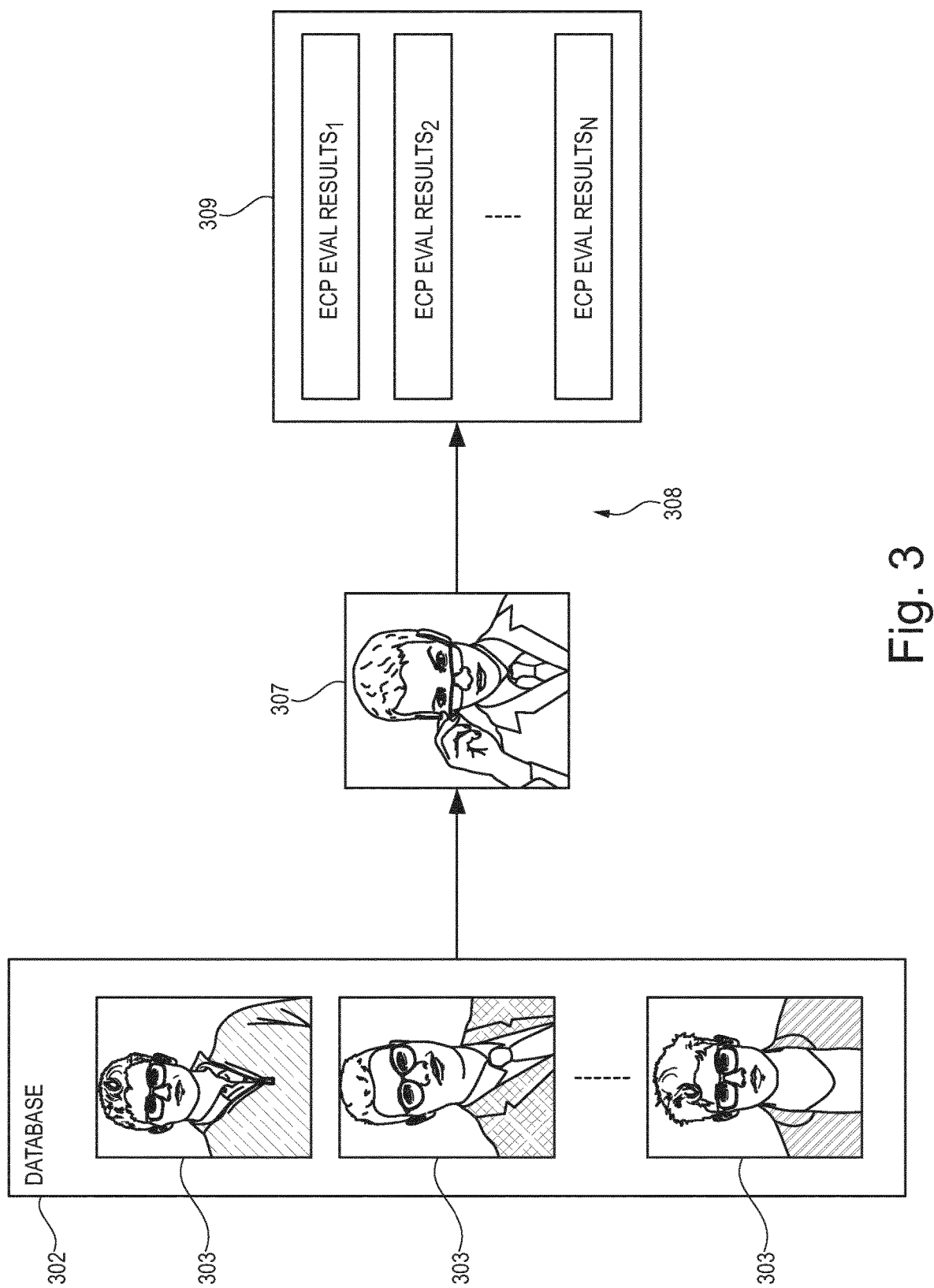
FIG. 3 is a flow diagram of a method for generating eye care professional-based evaluations of eyewear compatibility, according to an exemplary embodiment of the present disclosure.
Figure 4:
FIG. 4 is an illustration of a survey administered to eye care professionals, according to an exemplary embodiment of the present disclosure.

In order to provide accurate recommendations for a diverse population of users, the number of representative, 'labeled' images of the reference database needs to be increased and the composition thereof needs to be expanded. To this end, the reference database needs to include a corpus of images including a variety of age groups, genders, ethnicities, and the like. The reference database must also be dynamic and able to include new eyewear designs, new features (e.g., anti-reflective coating, colors, mirrors, etc.), new mounting models/rules, and new fitting models/rules. With reference now to FIG. 3, in generating the recommendation model, the thousands of images 303 of the reference database 302 must then be evaluated by, for instance, eye care professionals (ECPs) 307. Results of the ECP evaluation 309 then provide an expert evaluation 308, for each image 303 of the reference database 302, of the fit of the eyewear to the face of the user. An exemplary ECP evaluation 408 is shown in FIG. 4, wherein an image of a user wearing eyewear 403 can be graded according to specific criteria 410 (e.g., width of frame to width of face) and/or global criteria 411 (e.g., does the eyewear fit or not). The ECP evaluation 408 may include questions about compatibility between the face of the user and the eyewear (e.g., shape, size, color, mounting of the eyewear, fitting of the eyewear, etc.).

In an embodiment, the ECP evaluation 408 includes a series of images of the user wearing eyewear 403 and, alongside each image, a series of questions regarding specific points of suitability of the eyewear and the face of the person. For each question, the ECP may be given a limited number of possible answers. In an example, it may be a scale between −5 and +5, a scale between 0 and 10, or a choice of an item in a set of N items. For instance, as exemplary question and answers, an ECP may be asked: "Relative to the width of the face of the user, how do you evaluate the width of the equipment?" (a) too small, (b) okay, or (c) too large. In this way, the images of the reference database can be 'labeled'.

It can be appreciated that generating such a large reference database of 'labeled' images, however, would be costly, time-consuming and largely impractical, requiring thousands of images to be acquired of real people wearing real eyewear. Accordingly, the present disclosure provides an apparatus, method, and computer-readable storage medium for expanding an image database for evaluation of eyewear compatibility. In this way, the time and expense involved with creation and enrichment of the reference database can be reduced.

According to an embodiment, the present disclosure relates to a method for expanding an image database for evaluation of eyewear compatibility. For instance, a single image of a face of a user may be modified in order to generate a plurality of images of the face of the user wearing a plurality of eyewear designs, each of the plurality of eyewear designs being processed according to one or more eyewear specifications, fitting models, mounting models, and the like. The resulting plurality of images, therefore, can be uniquely evaluated by an ECP.

As above, the method can applied to a single image of a face of a user. The method comprises receiving a user image of a face of a user, receiving a frame image of a frame of eyewear from a plurality of images of frames of eyewear, processing, by processing circuitry, the received frame image, defining, within the processed frame image, a left boundary and a right boundary of the anterior face of the frame of the eyewear, receiving a filter image of a filter modeling a lens coating of the eyewear, processing, by the processing circuitry, the received filter image, merging the processed frame image and the processed filter image, and overlaying, by the processing circuitry, the merged processed frame image and the processed filter image onto the received user image of the face of user.

In generating the plurality of images, or 'virtual try on' images, the methods described herein minimize the number of real photographs that need be acquired. In an example, the methods described herein require only a single image of each user and a single image of each eyewear. The images may be a profile image or a portrait image, the single image of each user including a referential measurement to be able to rescale the image. The acquired images can then be processed in combination and in addition to consideration of filtering models that reflect varying lens treatments or coatings and mounting models and/or fitting models that reflect physical positioning of the eyewear on the face of the user. The mounting models and fitting models may provide different rules of mounting cross, defects in height mounting rules, defects in the position of the equipment onto the face of the user, defect in the brunch orientation, and the like. Height mounting rules may be defined by a distance, as measured in a plane of the lens of the frame, between a cross-mounting point marked on each lens and the bottom of the bounding box defining the lens in the frame. In defining height mounting according to frame sizes and faces sizes, such rules ensure the frame is correctly positioned onto the face. Brunch orientation rules allows for determination of the orientation of the frame on the face in profile images of the user, depending on face morphology (e.g., nose, cheeks, ears, . . . ) and frame sizes. By considering combinations and variations of the above described parameters, (e.g., (1) images of users, (2) images of eyewear, (3) images of filters, and (4) mounting models and/or fitting models) the number of images in a reference database can be appreciably greater than the number of real images that need be acquired.

Figure 5:
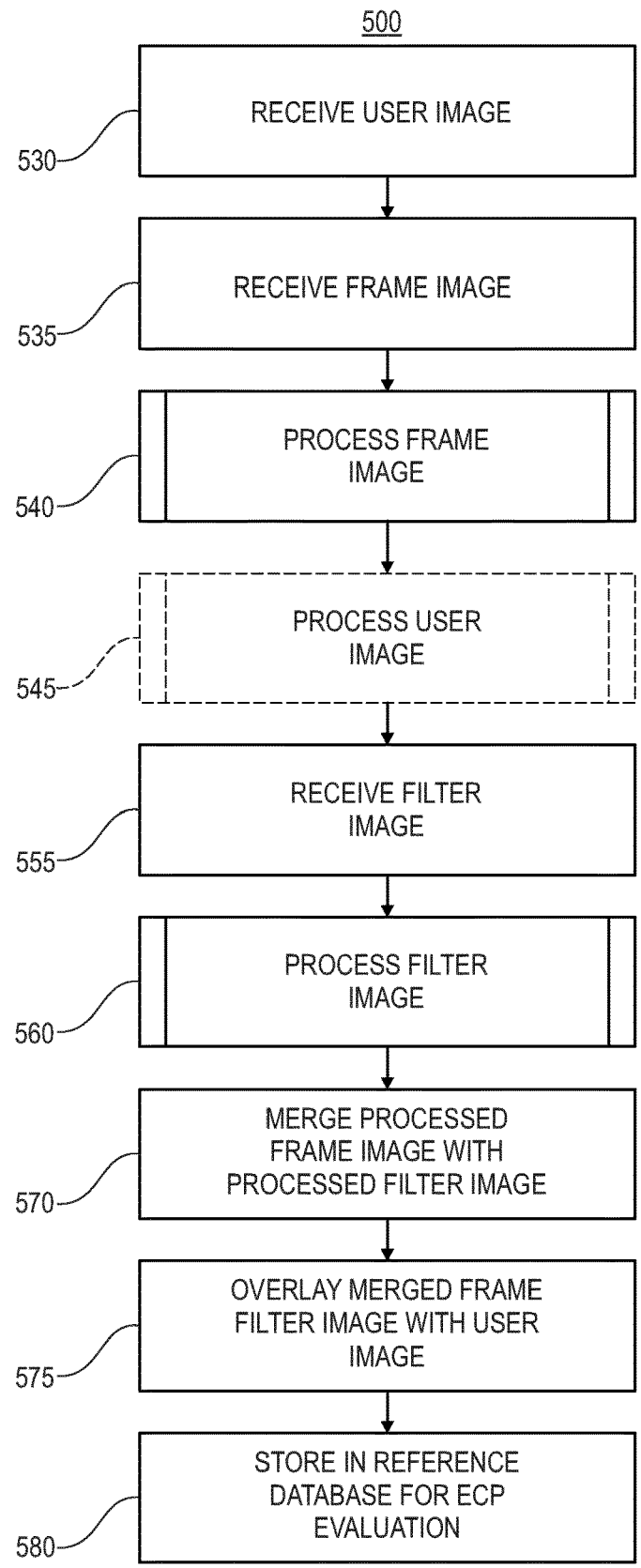
FIG. 5 is a flow diagram of method for expanding an image database for evaluation of eyewear compatibility, according to an exemplary embodiment of the present disclosure.

With reference again to the Figures, FIG. 5 provides a flow diagram of a method for expanding a database for evaluation of eyewear compatibility. Though presented as a single example, it can be appreciated that the flow diagram of FIG. 5 can be iteratively performed with myriad combinations of the above-described parameters in order to generate a large reference database.

At step 530 of method 500, a user image can be received from an image database. The user image may be one of a plurality of user images within the image database. The user image may be a portrait of the user or a profile of the user and may include a referential landmark for scaling during processing.

At step 535 of method 500, an image of eyewear, or a frame image, may be received from the image database. The frame image may be one of a plurality of frame images within the image database. The frame image may be a portrait of the frame or a profile of the frame.

At sub process 540 of method 500, the received frame image can be processed. Processing of the received frame image can include defining edges of a frame, thereof, and making transparent pixels that do not describe the frame. Sub process 540 of method 500 will be described in greater detail with reference to FIG. 6A, FIG. 6B, and FIG. 6C.

Optionally, at sub process 545 of method 500, the received user image can be processed. Though not mandatory, processing the received user image may be useful in adjusting the appearance of the eyes of the user as a result of magnification of the lenses of the eyewear. Sub process 545 of method 500 will be described in greater detail with reference to FIG. 7.

At step 555 of method 500, an image of a filter may be received from the image database. The filter image may be one of a plurality of filter images within the image database. In an example, the filter image may be reflective of a lens coating or lens treatment, including polarizations, films, mirrors, and the like. The filter image may be a portrait of the filter or a profile of the filter.

At sub process 560 of method 500, the received filter image can be processed. Processing of the received filter image can include centering and scaling the filter image, truncating the filter image according to the defined edges of the frame, and making transparent identified regions of the filter image. A more detailed description of sub process 560 of method 500 will be described with reference to FIG. 8A through FIG. 8D.

At step 570 of method 500, the frame image processed at sub process 540 and the filter image processed at sub process 560 can be merged into a merged filter frame image. Step 570 will be explained in greater detail with reference to FIG. 9A through FIG. 9C.

Figure 10A:
FIG. 10A is an exemplary image of a user, according to an embodiment of the present disclosure.
Figure 10B:
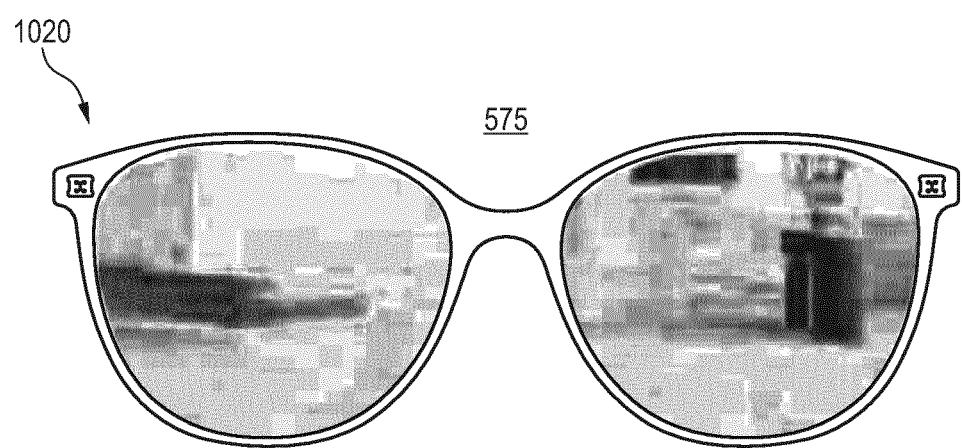
FIG. 10B is an illustration of a merging of a processed filter image and a processed frame image, according to an exemplary embodiment of the present disclosure.

At step 575 of method 500, the merged filter frame image can be overlaid on the received, and optionally processed, user image. Step 575 of method 500 will be described in greater detail with reference to FIG. 10A through FIG. 10C.

At step 580 of method 500, the overlaid image can be stored in a reference database for subsequent evaluation by an ECP and the like.

Method 500 may be repeated iteratively until each possible combination of user images, frame images, and filter images is considered. Moreover, each possible combination can be further expanded by consideration of mounting models and fitting models.

The reference database generated at step 580 of method 500, therefore, may comprise a plurality of images of users wearing equipment that have been generated from a limited number of real images of users, images of equipment, and images of filters. In this way, the burden of image acquisition is greatly reduced compared to traditional approaches.

Method 500, described above, will now be considered in view of an embodiment wherein the image of the face of the user is a single image of a portrait of a user, the image of the eyewear is a portrait image of eyewear, and the image of the filter is a portrait image of a filter modeling a coating that may be applied to lens of the eyewear. In an embodiment, the images described above may include two or more images of temples of the eyewear so that these may be accounted for, considering perspective, in rendering of a final image. Additionally, the above-described images can be further considered in view of a predetermined mounting model and/or fitting model. In an example, a mounting model may define height mounting in millimeters as $$H = \frac{B}{2} + 4,$$

where B is an interior vertical size of a circle of the frame. In an example, a fitting model is a law fixing a distance between eye, lens, and pantoscopic angle (i.e., lens tilt) according to morphological sizes (e.g., nose width, nose orientations, ear localization) and frame sizes (e.g., bridge width).

According to an embodiment, and as introduced with respect to FIG. 5, the present disclosure provides a method for processing the frame image, processing the filter image, optionally processing the user image, optionally merging the processed user image with the user image, merging the processed frame image with the processed filter image, and overlaying the merged filter frame image with the optionally processed user image.

Figure 6A:
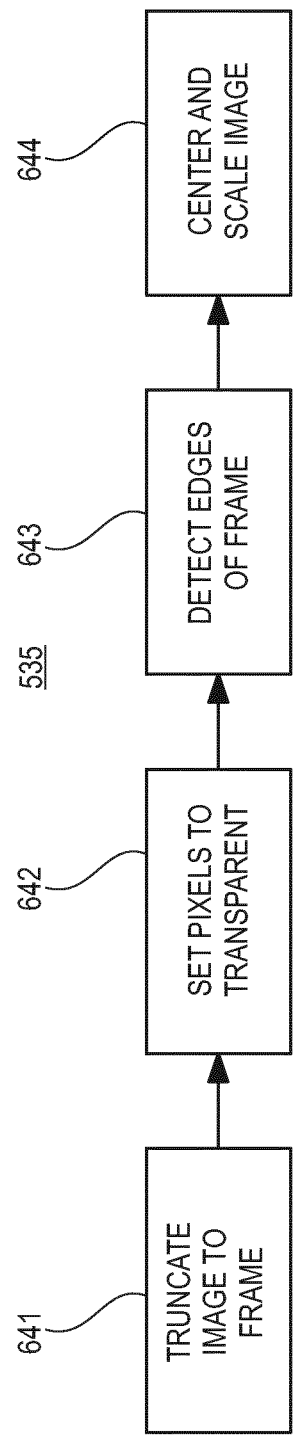
FIG. 6A is a flow diagram of a sub process of a method for expanding an image database for evaluation of eyewear compatibility, according to an exemplary embodiment of the present disclosure.
Figure 6B:
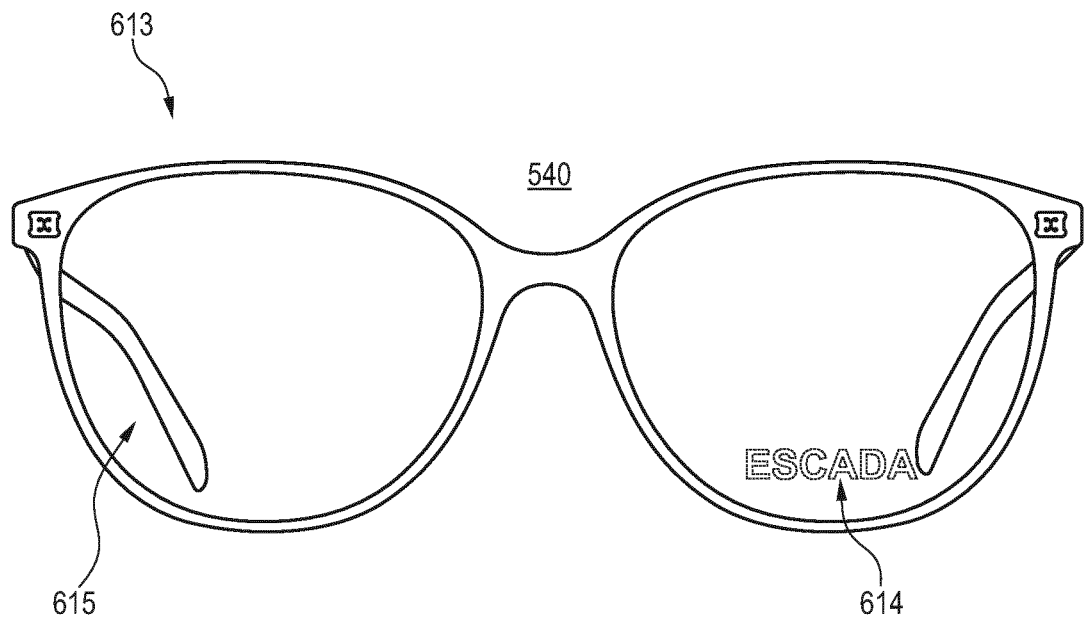
FIG. 6B is an illustration of a received frame image, according to an exemplary embodiment of the present disclosure.
Figure 6C:
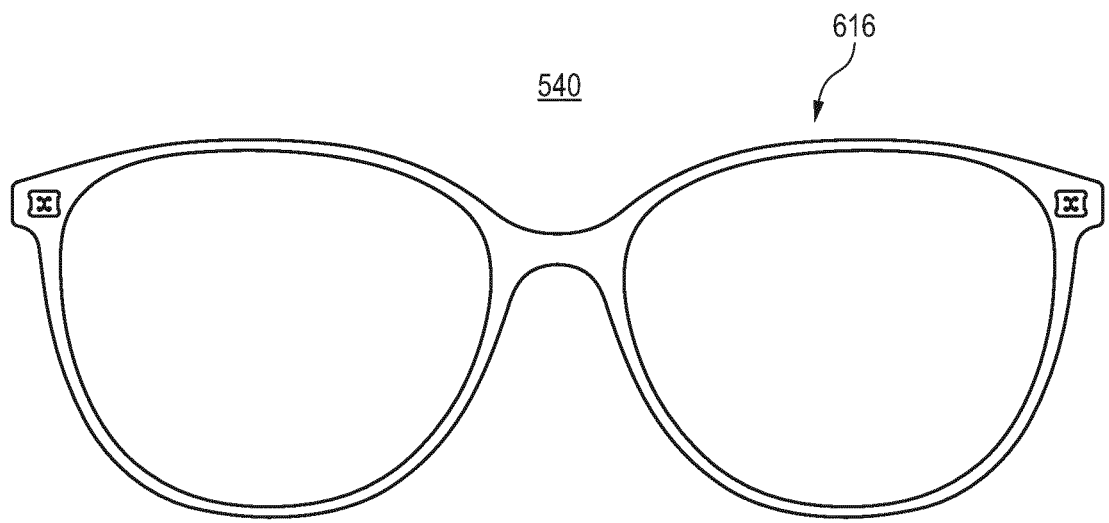
FIG. 6C is an illustration of a processed frame image, according to an exemplary embodiment of the present disclosure.

With reference to FIG. 6A, FIG. 6B, and FIG. 6C, a frame image 613 may be processed according to sub process 535 of method 500.

At step 641, the frame image 613 may be truncated relative to a bounding box defining the frame of the eyewear in the frame image 613.

At step 642, each pixel that does not correspond to a component of the eyewear, including branches, shadows, and the like, can be set to be transparent. In an example, the branches may be temple components of the frame. This includes pixels located inside 'circles' (could be other shapes) of the eyewear as well as pixels located outside the 'circles' of the eyewear. The 'circles' may correspond to lenses of the eyewear. In an example, pixel association can be determined by image segmentation techniques including thresholding methods, region growing methods to identify the eyewear, and the like. As in FIG. 6B, this can include temples 615 of the eyewear and branding 614 affiliated with a lens or maker of the eyewear.

At step 643, edges of the eyewear defining the 'circles' of the eyewear may be detected. The edges may define the aperture in which a lens of the eyewear may be inserted. In an embodiment, the edges may be detected as $C_{right}$ and $C_{left}$, wherein $C_{right}$ corresponds to a right circle of the eyewear and $C_{left}$ correspond to a left circle of the eyewear. The edges may be detected via image segmentation techniques including active contour-based segmentation techniques, region growing methods, and the like. In an example, edge detection may be determined by Canny edge detector. The circles of the eyewear, as defined above, will be used during subsequent sub processes as processing boundaries.

At step 644, the frame image 613 may be centered and scaled according to the received user image taking into account the predetermined mounting model and/or fitting model. Centering and scaling of the frame image 613 may be done to correct orientation of the user image and the frame image 613, accounting for differences in perspective, and may properly size the frame of the frame image 613 relative to the face of the user in the user image. The mounting model and/or fitting model may account for possible positions of the frame of the frame image 613 relative to the face of the user in the user image. Scaling of the frame image 613 may be performed according to one or more of a plurality of scaling factors. The scaling factors may include, among others, use of a single, ubiquitous referential landmark of known size in the images or use of a differential measurement between features of the images. For instance, wherein the scaling factor is, as a single, ubiquitous referential landmark, based on a screw head, a true dimensional value of the screw head in millimeters can be correlated with a digital dimensional value of the screw head in pixels. In another instance, wherein the scaling factor is, as a differential measurement between features of the images, based on a pupillary distance, a true pupillary distance in millimeters can be measured by pupilometer and correlated with a digital pupillary distance in pixels measured on the user image. In an embodiment, face detection methods and landmark estimation methods can be applied to the user image, the frame image 613, and the filter image, as appropriate. In an embodiment, regarding pupillary measurements and the user image, palpebral edges of the user in the user image may be detected and gravity centers thereof can be calculated. The gravity centers may then be used as an estimate for pupil centers and correlated with the known pupillary distance as measured by pupilometer and used as a scaling factor. True dimensions, as determined according to the above, can then be extrapolated to other images in a similar manner.

In an example, scaling can be performed to adjust the size of the frame image to the size of the user image. This can be based on pupillary distance in the user image and width of the frame in the frame image, each measured as described above. A normalization of one measured distance to the other results in a scaling factor that may be applied thereto.

As shown in FIG. 6C, a result of sub process 540 of method 500 is a processed frame image 616. The processed frame image 616 may then be subsequently used in method 500.

Figure 7:
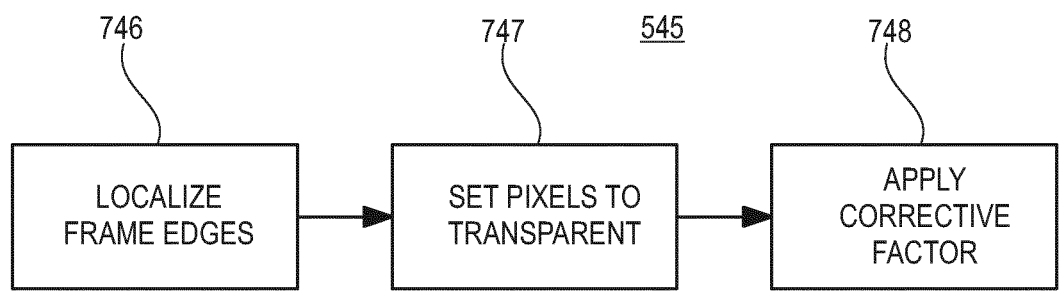
FIG. 7 is a flow diagram of a sub process of a method for expanding an image database for evaluation of eyewear compatibility, according to an exemplary embodiment of the present disclosure.

With reference to FIG. 7, the user image received at step 530 may be optionally processed according to sub process 545 of method 500.

At step 746 of sub process 545, frame edges $C_{right}$ and $C_{left}$, defining zones $C'_{right}$ and $C'_{left}$ and identified in sub process 540 of method 500, can be localized to the user image 746 according to mounting models and/or fitting models.

At step 747 of sub process 545, and similar to step 642 of sub process 540, regions of the user image not described by the defined zones $C'_{right}$ and $C'_{left}$ can be set to be transparent. $C'_{right}$ and $C'_{left}$ may correspond to a right lens and a left lens of the eyewear. In an embodiment, transparency can be modified by evaluating pixels of the user image and identifying those that are outside the frame edges defined by $C_{right}$ and $C_{left}$ and, therefore, not within the defined zones $C'_{right}$ and $C'_{left}$. These identified pixels can be set to be transparent. In an example, pixel identification can be determined by image segmentation techniques including thresholding methods, region growing methods to identify the eyewear, and the like.

At step 748 of sub process 545, a corrective factor may be applied to the defined zones $C'_{right}$ and $C'_{left}$ remaining in the processed user image. By applying a corrective factor, the processed user image may reflect the visual impact of a magnification or minification of eyes of the user by a lens used in the eyewear.

According to an embodiment, the processed user image from step 748 of sub process 545 may then be merged with the user image received at step 530 in order to generate a processed user image that may be finally merged with a merged filter frame image, as will be described later. As sub process 545 of method 500 is optional, the remainder of method 500 will be described excepting this sub process.

With reference to FIG. 8A, FIG. 8B, FIG. 8C and FIG. 8D, a filter image 818 received at step 555 of method 500 may be processed according to sub process 560 of method 500. In an embodiment, the filter image 818 may represent an image of an environment in which the eyewear will be utilized, the image of the environment being a reflection as perceived by an outside observer. Such an environment may be the inside of a room, as in FIG. 8B, or an outdoors setting. In a non-limiting example, the environment may also be a sunny outdoors location wherein reflections of the sun are present on a polarized lens 'filter'.

Figure 8A:
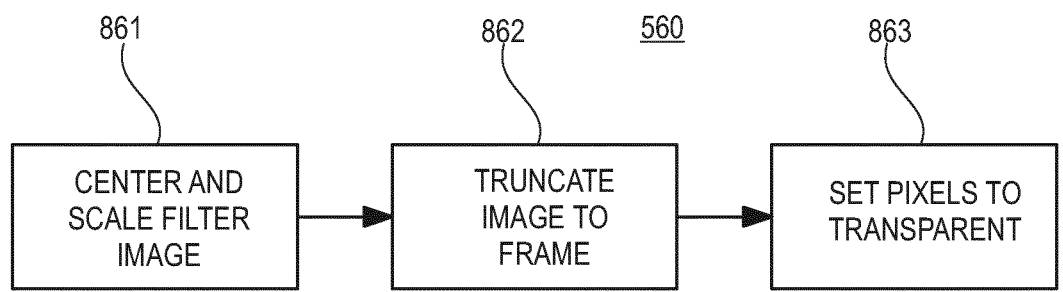
FIG. 8A is a flow diagram of a sub process of a method for expanding an image database for evaluation of eyewear compatibility, according to an exemplary embodiment of the present disclosure.
Figure 8B:
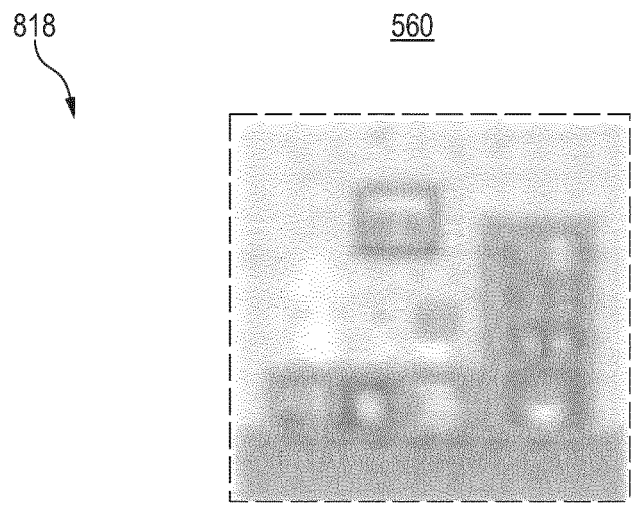
FIG. 8B is an illustration of a filter image, according to an exemplary embodiment of the present disclosure.
Figure 8C:
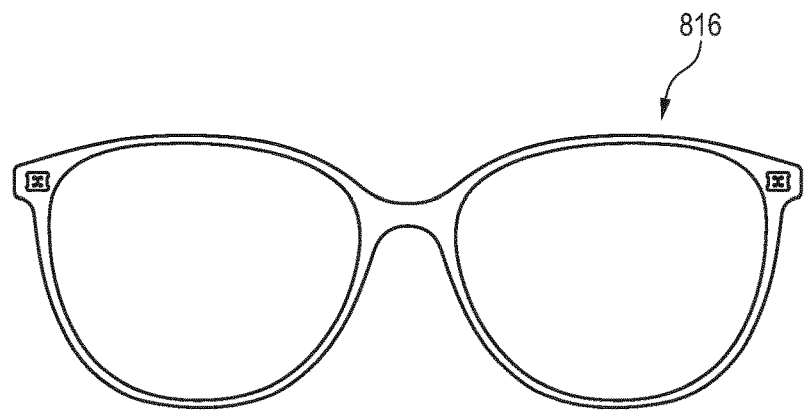
FIG. 8C is an illustration of a processed frame image, according to an exemplary embodiment of the present disclosure.

At step 861 of sub process 560, the received filter image 818 may be centered and scaled according to the processed frame image of sub process 540 of method 500. An illustration of a processed frame image 816 is shown in FIG. 8C.

At step 862 of sub process 560, and using the bounding box as defined in sub process 540 of method 500, the received filter image 818 may be truncated relative to the bounding box defining the frame of the eyewear in the processed frame image 816.

Figure 8D:
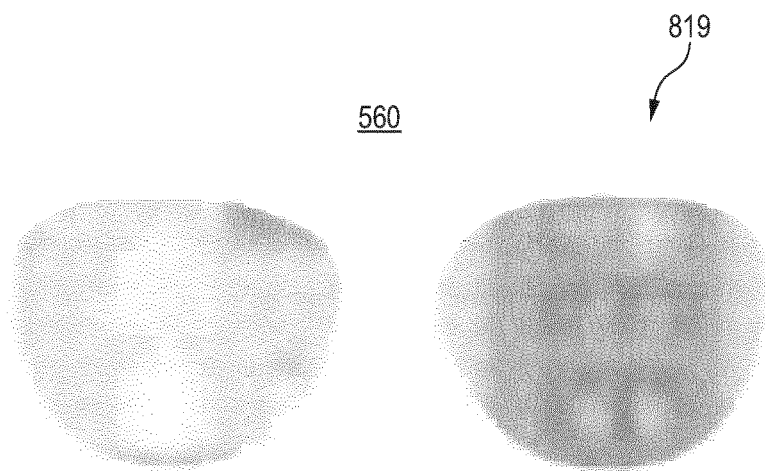
FIG. 8D is an illustration of a processed filter image, according to an exemplary embodiment of the present disclosure.

At step 863 of sub process 560, and based on the frame edges $C_{right}$ and $C_{left}$ defined in sub process 540 of method 500, all pixels outside the frame edges may set to be transparent. In other words, all pixels of the filter image 818 not within zones of the frame image 816 defined as $C'_{right}$ and $C'_{left}$ may be identified and set to be transparent. In an example, pixel identification can be determined by image segmentation techniques including thresholding methods, region growing methods to identify the eyewear, and the like. Therefore, a processed filter image 819, as in FIG. 8D, represents the impact of the filter image 818 with regard to each lens of eyewear.

Figure 9A:
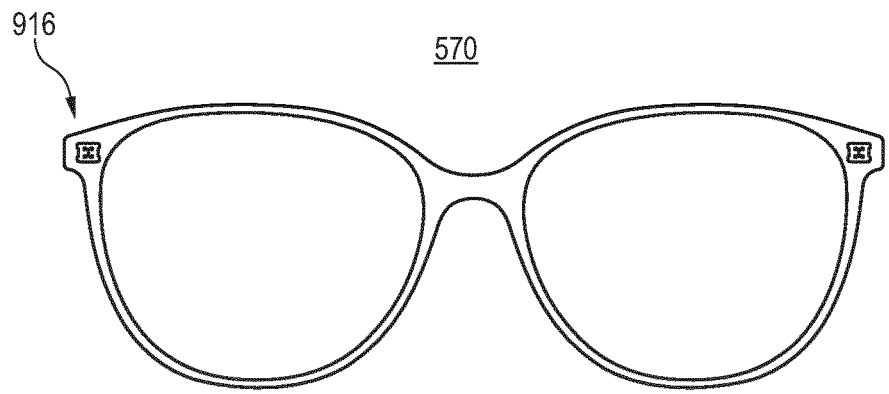
FIG. 9A is an illustration of a processed frame image, according to an exemplary embodiment of the present disclosure.
Figure 9B:
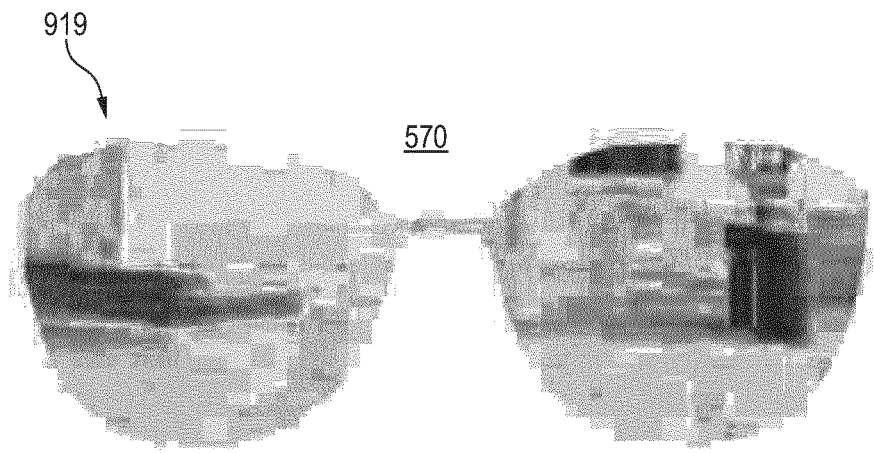
FIG. 9B is an illustration of a processed filter image, according to an exemplary embodiment of the present disclosure.
Figure 9C:
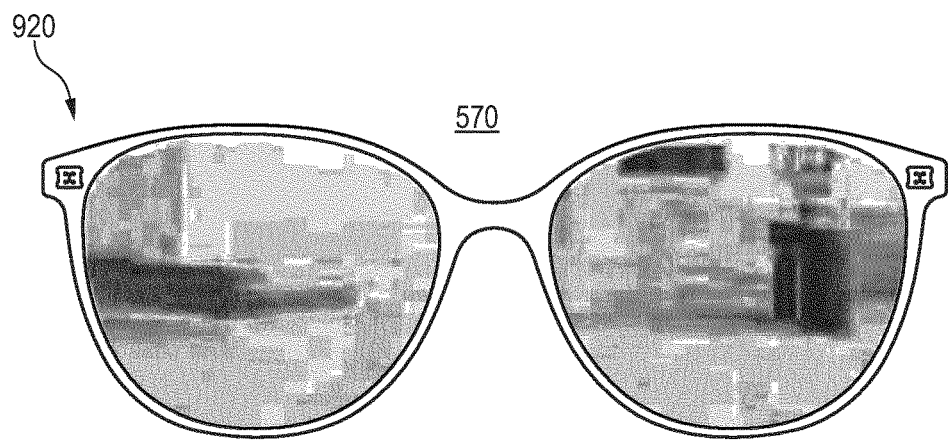
FIG. 9C is an illustration of a merging of a processed filter image and a processed frame image, according to an exemplary embodiment of the present disclosure.

The processed filter image of sub process 560 may then be provided to step 570 of method 500. As shown in FIG. 9A and FIG. 9B, a processed frame image 916 may be merged with a processed filter image 919 in order to generate a merged filter frame image 920, as shown in FIG. 9C. In an embodiment, merging of the processed frame image 916 and the processed filter image 919 may be performed according to methods understood by one of ordinary skill in the art.

Figure 10C:
FIG. 10C is an illustration of an overlay of an exemplary image of a user and a merging of a processed filter image and a processed frame image, according to an exemplary embodiment of the present disclosure.

In order to produce an image ready to be stored within a reference database at step 580 of method 500, the merged filter frame image of step 570 of method 500 and the frame image received at step 530 of method 500 can be merged. Accordingly, at step 575 of method 500 and with reference to FIG. 10A, FIG. 10B, and FIG. 10C, a user image 1022 and a merged filter frame image 1020 can be merged to generate the 'virtual try on' image of FIG. 10C. In other words, the merged filter frame image 1020 can be overlaid on the user image 1022, or otherwise merged therewith, in order to generate an overlaid image 1023. The overlaid image 1023 of step 575 shown in FIG. 10C is an exemplary illustration of image of user wearing eyewear that can be generated by method 500 of the present disclosure.

According to an embodiment, overlaid images generated at step 575 of method 500 can then be stored within the reference database at step 580 in order to be further evaluated by ECPs during development of a recommendation model based thereon.

Figure 11:
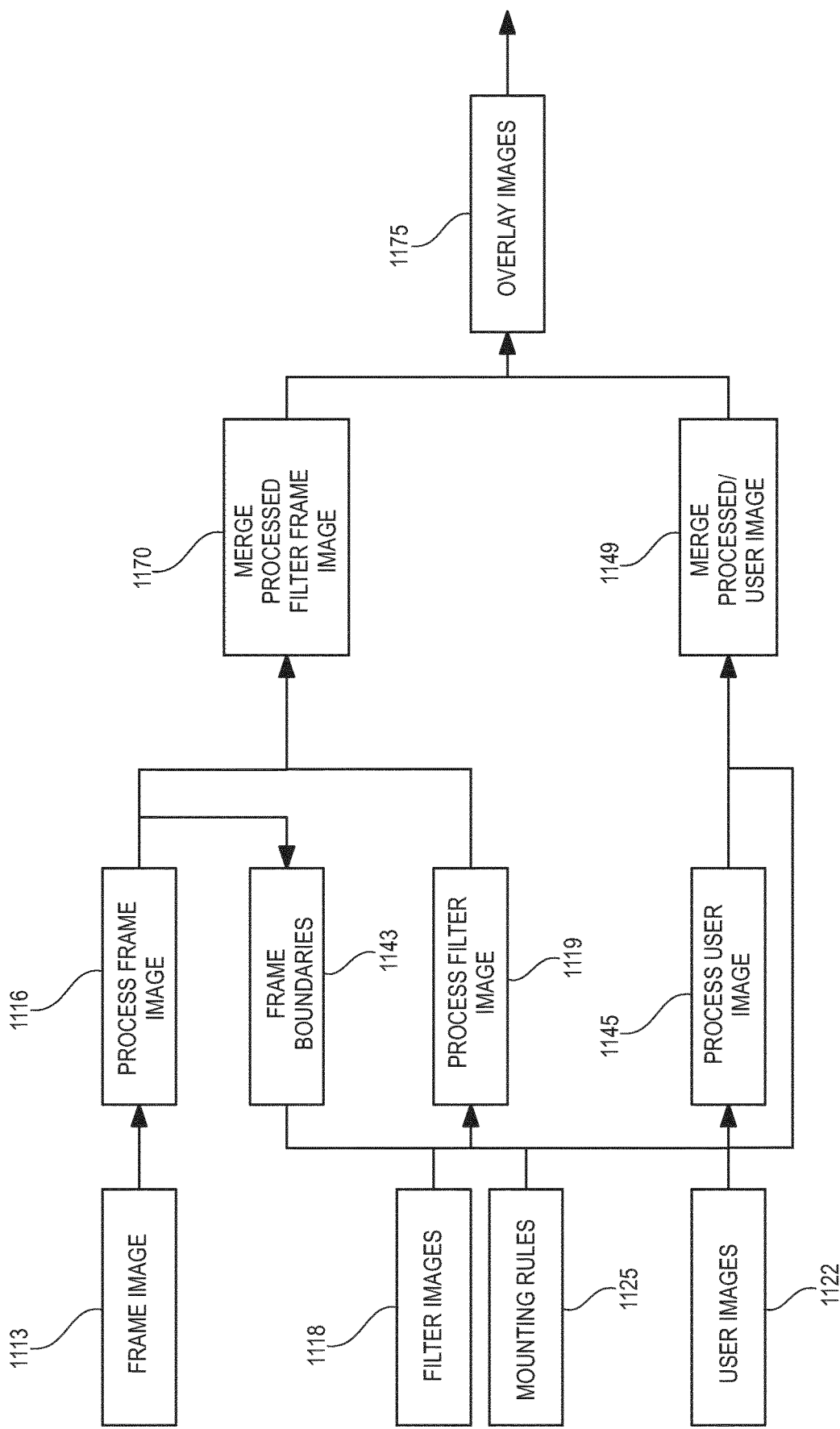
FIG. 11 is a flow diagram of an exemplary implementation of a method for expanding an image database for evaluation of eyewear compatibility.

With reference now to FIG. 11, an exemplary flow diagram of the present disclosure will be described. The flow diagram of FIG. 11 is presented differently than the linear flow diagram of FIG. 5 in order to show the non-limiting nature of the flow diagram and what relationships are important.

Initially, a frame image 1113 may be processed 1116 to identify a bounding box, frame edges $C_{right}$ and $C_{left}$, and to prepare the frame to be later merged with a processed filter image. Frame edges $C_{right}$ and $C_{left}$, referred to as frame boundaries 1143, may be used in generating a processed filter image 1119 and a processed user image 1145. Next, in generating the processed filter image 1119, a filter image 1118 may be centered and scaled according to the processed frame image, using the same bounding box and frame boundaries 1143 to define transparent regions of the filter image 1118. Mounting rules and/or fitting rules 1125 may also be considered. The processed frame image 1116 and the processed filter image 1119 may then be merged in order to generate a merged filter frame image 1170. Next, a processed user image 1145 may be generated from a user image 1122. The processed user image 1145 may be generated according to the frame boundaries 1143 and based on a visual prescription of the user. Again, mounting rules and/or fitting rules 1125 may also be considered. The processed user image 1145 may then be merged with the user image 1122 in order to generate a merged user image 1149. Having generated the merged filter frame image 1170 and the merged user image 1149, the images may be finally merged in order to generate an overlaid image. In merging the images, the merged filter frame image 1170 may be overlaid on the merged user image 1149. The overlaid image 1175 may then be stored in a reference database for subsequent evaluation by an ECP during development of a recommendation model.

According to an embodiment, the method of the present disclosure generates a reference database of 'labeled' images by digitally combining a limited number of images of users, images of eyewear, and images of filters according to mounting models and/or fitting models in variations that 'artificially' expand the reference database. To this end, the method generates $N_g*N_f$ images by merging images of eyewear with images of filters, where $N_g$ is the number of images of eyewear and $N_f$ is the number of images of filters. These merged images may contain at least four channels, three for color and one for transparency. The region of the merged image outside a frame of the eyewear, including temples of the eyewear, can be made transparent and the region of the merged image inside the frame of the eyewear can be made semi-transparent, transparent, or not according to the filter image. The method than generates $N_g*N_f*N_a*N_w$ images overlaying the set of merged images with received user images of a face of a user, where $N_w$ is the number of images of users and $N_a$ indicates the consideration of mounting models and/or fitting models. By considering more than one mounting model and/or fitting model, it may be possible to generate a continuous model of structural, positional, and mounting fit of the eyewear on the face of the user based on expert advice, wherein the structural positioning of the eyewear on the face of the user simulates different kinds of mounting or fitting errors. Therefore, it can be appreciated that the methods of the present disclosure allow for a multiplicative impact by providing a single image of a user. The need to acquire thousands of images of users wearing different eyewear is thus eliminated.

Figure 12:
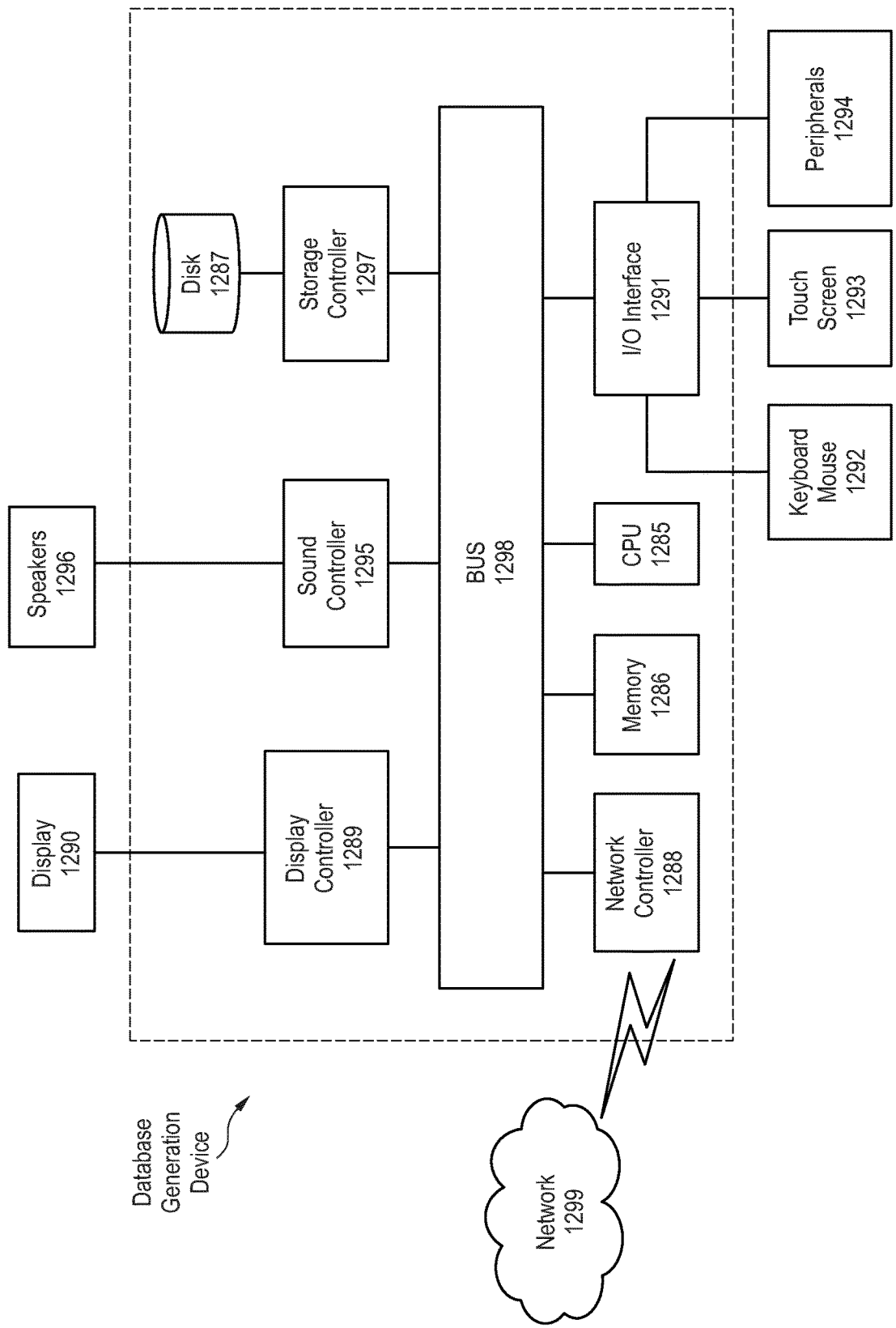
FIG. 12 is hardware configuration of a database generation device, according to an exemplary embodiment of the present disclosure.

With reference now to FIG. 12, FIG. 12 is a hardware description of a database generation device, according to an exemplary embodiment of the present disclosure.

In FIG. 12, the database generation device includes a CPU 1285 which performs the processes described above. The database generation device may be a general-purpose computer or a particular, special-purpose machine. In one embodiment, the database generation device becomes a particular, special-purpose machine when the processor 1285 is programmed to perform visual equipment selection (and in particular, any of the processes discussed with reference to the above disclosure).

Alternatively, or additionally, the CPU 1285 may be implemented on an FPGA, ASIC, PLD or using discrete logic circuits, as one of ordinary skill in the art would recognize. Further, CPU 1285 may be implemented as multiple processors cooperatively working in parallel to perform the instructions of the inventive processes described above.

The database generation device also includes a network controller 1288, such as an Intel Ethernet PRO network interface card, for interfacing with network 1299. As can be appreciated, the network 1299 can be a public network, such as the Internet, or a private network such as an LAN or WAN network, or any combination thereof and can also include PSTN or ISDN sub-networks. The network 1299 can also be wired, such as an Ethernet network, or can be wireless such as a cellular network including EDGE, 3G and 4G wireless cellular systems. The wireless network can also be WiFi, Bluetooth, or any other wireless form of communication that is known.

The database generation device further includes a display controller 1289, such as a graphics card or graphics adaptor for interfacing with display 1290, such as a monitor. A general purpose I/O interface 1291 interfaces with a keyboard and/or mouse 1292 as well as a touch screen panel 1293 on or separate from display 1290. General purpose I/O interface 1291 also connects to a variety of peripherals 1294 including printers and scanners.

A sound controller 1295 is also provided in the database generation device to interface with speakers/microphone 1296 thereby providing sounds and/or music.

The general purpose storage controller 1297 connects the storage medium disk 1287 with communication bus 1298, which may be an ISA, EISA, VESA, PCI, or similar, for interconnecting all of the components of the database generation device. A description of the general features and functionality of the display 1290, keyboard and/or mouse 1292, as well as the display controller 1289, storage controller 1297, network controller 1288, sound controller 1295, and general purpose I/O interface 1291 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) A method for expanding an image database for evaluation of eyewear compatibility, comprising receiving a user image of a face of a user, receiving a frame image of a frame of eyewear from a plurality of images of frames of eyewear, processing, by processing circuitry, the received frame image by setting, as transparent, pixels of the received frame image except for an anterior face of the frame of the eyewear, defining, within the processed frame image, a left boundary and a right boundary of the anterior face of the frame of the eyewear, the defined left boundary and the defined right boundary corresponding to the left eye and the right eye, respectively, receiving a filter image of a filter modeling a lens coating of the eyewear, processing, by the processing circuitry, the received filter image by setting, as transparent, pixels in the received filter image outside the frame of the eyewear based on the defined left boundary and the defined right boundary of the anterior face of the frame of the eyewear, merging the processed frame image and the processed filter image, and overlaying, by the processing circuitry, the merged processed frame image and the processed filter image onto the received user image of the face of user.

(2) The method of (1), wherein the receiving includes receiving the frame image of the frame of the eyewear and two or more images of temples of the frame of the eyewear, the two or more images of the temples of the frame of the eyewear being utilized during the overlaying.

(3) The method of either (1) or (2), wherein the processing includes processing the received frame image by centering the received frame image based on the received user image and fit models defining mounting the frame of the eyewear on the face of the user.

(4) The method of any one of (1) to (3), wherein the centering includes centering the received frame image according to an orientation of the face of the user in the received user image.

(5) The method of any one of (1) to (4), wherein the processing includes processing the received frame image by scaling the received frame image based on the received user image and one or more scaling factors, the one or more scaling factors including a pupillary factor, the pupillary factor being a relationship between a real pupillary distance and a digital pupillary distance, the digital pupillary distance being measured on the received frame image.

(6) The method of any one of (1) to (5), wherein the digital pupillary distance is determined by calculating a distance between pupils of eyes of the user, the pupils of the eyes of the user being defined as gravity centers of palpebral fissures of the face of the user.

(7) The method of any one of (1) to (6), further comprising processing the received user image of the face of the user based on the defined left boundary and the defined right boundary of the anterior face of the frame of the eyewear, pixels in the received user image outside the defined left boundary and the defined right boundary being set as transparent.

(8) The method of any one of (1) to (7), further comprising applying a corrective factor to the processed received user image based on a vision prescription of the user.

(9) The method of any one of (1) to (8), further comprising applying a corrective factor to the processed received user image based on a material of the frame of the eyewear of the processed frame image and the filter of the processed filter image.

(10) An apparatus for expanding an image database for evaluation of eyewear compatibility, comprising processing circuitry configured to receive a user image of a face of a user, receive a frame image of a frame of eyewear from a plurality of images of frames of eyewear, process the received frame image by setting, as transparent, pixels of the received frame image except for an anterior face of the frame of the eyewear, define, within the processed frame image, a left boundary and a right boundary of the anterior face of the frame of the eyewear, the defined left boundary and the defined right boundary corresponding to the left eye and the right eye, respectively, receive a filter image of a filter modeling a lens coating of the eyewear, process the received filter image by setting, as transparent, pixels in the received filter image outside the frame of the eyewear based on the defined left boundary and the defined right boundary of the anterior face of the frame of the eyewear, merge the processed frame image and the processed filter image, and overlay the merged processed frame image and the processed filter image onto the received user image of the face of user.

(11) The apparatus of (10), wherein the processing circuitry is further configured to process the received frame image by centering the received frame image based on the received user image and fit models defining mounting the frame of the eyewear on the face of the user.

(12) The apparatus of either (10) or (11), wherein the processing circuitry is further configured to process the received frame image by scaling the received frame image based on the received user image and one or more scaling factors, the one or more scaling factors including a pupillary factor, the pupillary factor being a relationship between a real pupillary distance and a digital pupillary distance, the digital pupillary distance being measured on the received frame image.

(13) The apparatus of any one of (10) to (12), wherein the processing circuitry is further configured to process the received user image of the face of the user based on the defined left boundary and the defined right boundary of the anterior face of the frame of the eyewear, pixels in the received user image outside the defined left boundary and the defined right boundary being set as transparent.

(14) The apparatus of any one of (10) to (13), wherein the processing circuitry is further configured to apply a corrective factor to the processed received user image based on a vision prescription of the user.

(15) A non-transitory computer-readable storage medium storing computer-readable instructions that, when executed by a computer, cause the computer to perform a method for expanding an image database for evaluation of eyewear compatibility, comprising receiving a user image of a face of a user, receiving a frame image of a frame of eyewear from a plurality of images of frames of eyewear, processing the received frame image by setting, as transparent, pixels of the received frame image except for an anterior face of the frame of the eyewear, defining, within the processed frame image, a left boundary and a right boundary of the anterior face of the frame of the eyewear, the defined left boundary and the defined right boundary corresponding to the left eye and the right eye, respectively, receiving a filter image of a filter modeling a lens coating of the eyewear, processing the received filter image by setting, as transparent, pixels in the received filter image outside the frame of the eyewear based on the defined left boundary and the defined right boundary of the anterior face of the frame of the eyewear, merging the processed frame image and the processed filter image, and overlaying the merged processed frame image and the processed filter image onto the received user image of the face of user.

(16) The method of any one of (1) to (9), wherein the processing includes processing the received frame image by scaling the received frame image based on the received user image and one or more scaling factors, the one or more scaling factors including a frame factor, the frame factor being a relationship between a real width of the frame of eyewear and a corresponding pixel width of the frame of eyewear in the received frame image.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for expanding an image database for evaluation of eyewear compatibility, comprising:
   receiving a user image of a face of a user;
   receiving a frame image of a frame of eyewear from a plurality of images of frames of eyewear;
   processing, by processing circuitry, the received frame image by setting, as transparent, pixels of the received frame image except for an anterior face of the frame of the eyewear;
   defining, within the processed frame image, a left boundary and a right boundary of the anterior face of the frame of the eyewear, the defined left boundary and the defined right boundary corresponding to the left eye and the right eye, respectively;
   receiving a filter image of a filter modeling a lens coating of the eyewear;
   processing, by the processing circuitry, the received filter image by setting, as transparent, pixels in the received filter image outside the frame of the eyewear based on the defined left boundary and the defined right boundary of the anterior face of the frame of the eyewear;
   merging the processed frame image and the processed filter image; and
   overlaying, by the processing circuitry, the merged processed frame image and the processed filter image onto the received user image of the face of user.

2. The method of claim 1, wherein the receiving includes receiving the frame image of the frame of the eyewear and two or more images of temples of the frame of the eyewear, the two or more images of the temples of the frame of the eyewear being utilized during the overlaying.

3. The method of claim 1, wherein the processing includes processing the received frame image by centering the received frame image based on the received user image and fit models defining mounting the frame of the eyewear on the face of the user.

4. The method of claim 3, wherein the centering includes centering the received frame image according to an orientation of the face of the user in the received user image.

5. The method according to claim 1, wherein the processing includes processing the received frame image by
   scaling the received frame image based on the received user image and one or more scaling factors, the one or more scaling factors including a pupillary factor, the pupillary factor being a relationship between a real pupillary distance and a digital pupillary distance, the digital pupillary distance being measured on the received frame image.

6. The method of claim 5, wherein the digital pupillary distance is determined by calculating a distance between pupils of eyes of the user, the pupils of the eyes of the user being defined as gravity centers of palpebral fissures of the face of the user.

7. The method of claim 1, further comprising processing the received user image of the face of the user based on the defined left boundary and the defined right boundary of the anterior face of the frame of the eyewear, pixels in the received user image outside the defined left boundary and the defined right boundary being set as transparent.

8. The method of claim 7, further comprising applying a corrective factor to the processed received user image based on a vision prescription of the user.

9. The method of claim 7, further comprising applying a corrective factor to the processed received user image based on a material of the frame of the eyewear of the processed frame image and the filter of the processed filter image.

10. The method according to claim 1, wherein the received filter image is centered and scale according to the processed frame image.

11. An apparatus for expanding an image database for evaluation of eyewear compatibility, comprising:
processing circuitry configured to
receive a user image of a face of a user,
receive a frame image of a frame of eyewear from a plurality of images of frames of eyewear,
process the received frame image by setting, as transparent, pixels of the received frame image except for an anterior face of the frame of the eyewear,
define, within the processed frame image, a left boundary and a right boundary of the anterior face of the frame of the eyewear, the defined left boundary and the defined right boundary corresponding to the left eye and the right eye, respectively,
receive a filter image of a filter modeling a lens coating of the eyewear,
process the received filter image by setting, as transparent, pixels in the received filter image outside the frame of the eyewear based on the defined left boundary and the defined right boundary of the anterior face of the frame of the eyewear,
merge the processed frame image and the processed filter image, and
overlay the merged processed frame image and the processed filter image onto the received user image of the face of user.

12. The apparatus of claim 11, wherein the processing circuitry is further configured to process the received frame image by centering the received frame image based on the received user image and fit models defining mounting the frame of the eyewear on the face of the user.

13. The apparatus of claim 11, wherein the processing circuitry is further
configured to process the received frame image by scaling the received frame image based on the received user image and one or more scaling factors, the one or more scaling factors including a pupillary factor, the pupillary factor being a relationship between a real pupillary distance and a digital pupillary distance, the digital pupillary distance being measured on the received frame image.

14. The apparatus according to claim 11, wherein the processing circuitry is further configured to process the received user image of the face of the user based on the defined left boundary and the defined right boundary of the anterior face of the frame of the eyewear, pixels in the received user image outside the defined left boundary and the defined right boundary being set as transparent.

15. The apparatus of claim 14, wherein the processing circuitry is further configured to apply a corrective factor to the processed received user image based on a vision prescription of the user.

16. The apparatus according to claim 11, wherein the processing circuitry is further configured to center and scale the received filter image according to the processed frame image.

17. A non-transitory computer-readable storage medium storing computer-readable instructions that, when executed by a computer, cause the computer to perform a method for expanding an image database for evaluation of eyewear compatibility, comprising:
receiving a user image of a face of a user;
receiving a frame image of a frame of eyewear from a plurality of images of frames of eyewear;
processing the received frame image by setting, as transparent, pixels of the received frame image except for an anterior face of the frame of the eyewear;
defining, within the processed frame image, a left boundary and a right boundary of the anterior face of the frame of the eyewear, the defined left boundary and the defined right boundary corresponding to the left eye and the right eye, respectively;
receiving a filter image of a filter modeling a lens coating of the eyewear;
processing the received filter image by setting, as transparent, pixels in the received filter image outside the frame of the eyewear based on the defined left boundary and the defined right boundary of the anterior face of the frame of the eyewear;
merging the processed frame image and the processed filter image; and
overlaying the merged processed frame image and the processed filter image onto the received user image of the face of user.

* * * * *